United States Patent [19]

Kawamura

[11] Patent Number: 4,745,754
[45] Date of Patent: May 24, 1988

[54] TURBO COMPOUND ENGINE
[75] Inventor: Hideo Kawamura, Kanagawa, Japan
[73] Assignee: Isuzu Motors Limited, Tokyo, Japan
[21] Appl. No.: 919,757
[22] Filed: Oct. 16, 1986
[30] Foreign Application Priority Data
  Oct. 19, 1985 [JP] Japan .................... 60-233935
[51] Int. Cl.[4] .................. F02B 37/04; F02B 41/10
[52] U.S. Cl. ............................. 60/608; 60/597; 290/52
[58] Field of Search ........... 60/597, 598, 605, 607, 60/608; 290/52

[56] References Cited
FOREIGN PATENT DOCUMENTS

| | | |
|---|---|---|
| 141634 | 5/1985 | European Pat. Off. ......... 60/597 |
| 0178270 | 4/1986 | European Pat. Off. . |
| 962764 | 4/1957 | Fed. Rep. of Germany . |
| 1040839 | 10/1958 | Fed. Rep. of Germany . |
| 3303969 | 9/1984 | Fed. Rep. of Germany . |
| 141711 | 8/1984 | Japan ............................ 60/608 |
| 192652 | 11/1937 | Switzerland . |

OTHER PUBLICATIONS

European Search Report, Jan. 28, 1987, The Hague, Netherlands, By Examiner Ernst.

Primary Examiner—Michael Koczo
Attorney, Agent, or Firm—Staas & Halsey

[57] ABSTRACT

A turbo compound engine includes a generator for converting the exhaust energy of an internal combustion engine to electric energy and a motor operatively coupled to the output shaft of the internal combustion engine and drivable by the electric energy generated by the generator, so that the energy of the internal combustion engine can be recovered. The torque produced by the internal combustion engine is assisted dependent on the speed of rotation of the output shaft of the engine.

4 Claims, 2 Drawing Sheets

TURBO COMPOUND ENGINE

BACKGROUND OF THE INVENTION

The present invention relates to a turbo compound engine capable of recovering the exhaust energy of an internal combustion engine, and more particularly to a turbo compound engine including a generator drivable by the exhaust energy of the engine and a motor operatively coupled to the output shaft of the engine and energizable by the output of the generator for recovering the exhaust energy.

There have been developed in recent years thermally insulated engines having various components made of ceramics, including an outer wall of an exhaust manifold, a cylinder liner, an insulating plate for a cylinder head, and a piston, for example. In such thermally insulated engines, it is not necessary to cool the engine by radiating the heat generated inside the engine, but the energy of a high-temperature exhaust gas discharged by the engine is recovered and fed back to the output shaft of the engine for increasing the output power from the engine.

One known method of recovering the exhaust energy of an engine utilizes a multistage gear speed reducer mechanism for reducing the speed of rotation of a turbine which is rotated by the exhaust gas to transmit the rotative power of the turbine to the crankshaft.

Japanese Laid-Open Patent Publication No. 59(1984)-141713 discloses an exhaust energy recovering device. According to the disclosed device, the exhaust turbine of an AC generator is rotated by the energy of an exhaust gas discharged from an internal combustion engine, and an induction motor operatively coupled to the output shaft of the engine is driven by the output from the AC generator to recover the exhaust energy. The device also includes means for determining the magnitude of a load on the engine to control the amount of intake air, so that the temperature of the exhaust gas can be increased when the engine load is small.

In the former method of recovering the exhaust energy, the transmission efficiency of a one-stage gear speed reducer is in the range of from 0.9 to 0.95, and hence, the transmission efficiency of a three-stage gear speed reducer is low, i.e., about 80%. The gear mechanism is complex and highly costly. Furthermore, there is a problem with respect to the location where the gear mechanism is to be placed, since the space in the engine compartment is small on a small-size passenger car. According to the latter exhaust energy recovering device, the amount of intake air is controlled dependent on the magnitude of the load on the internal combustion engine, and the AC generator is rotated by the energy of the produced exhaust gas to generate AC power, which is controlled to energize the induction motor for rotating the output shaft of the engine. However, this device is disadvantegeous in that the extent to which the output shaft is driven is controlled indirectly, and the motor cannot be driven at a rate commensurate with the rotation of the output shaft.

SUMMARY OF THE INVENTION

It is an object of the present invention to provide a turbo compound engine capable of transmitting the rotative power of an exhaust turbine driven by the energy of an exhaust gas discharged by an internal combustion engine, to the output shaft of the engine at a rate commensurate with the rotation of the output shaft, without employing a multistage gear speed reducer mechanism.

According to the present invention, there is provided a turbo compound engine comprising a generator drivable by an exhaust turbine coupled to an exhaust pipe of an internal combustion engine, a motor operatively coupled to the output shaft of the internal combustion engine, speed detecting means for detecting the speed of rotation of the internal combustion engine, and control means for controlling the frequency of electric power generated by the generator based on a signal from the speed detecting means to control operation of the motor.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
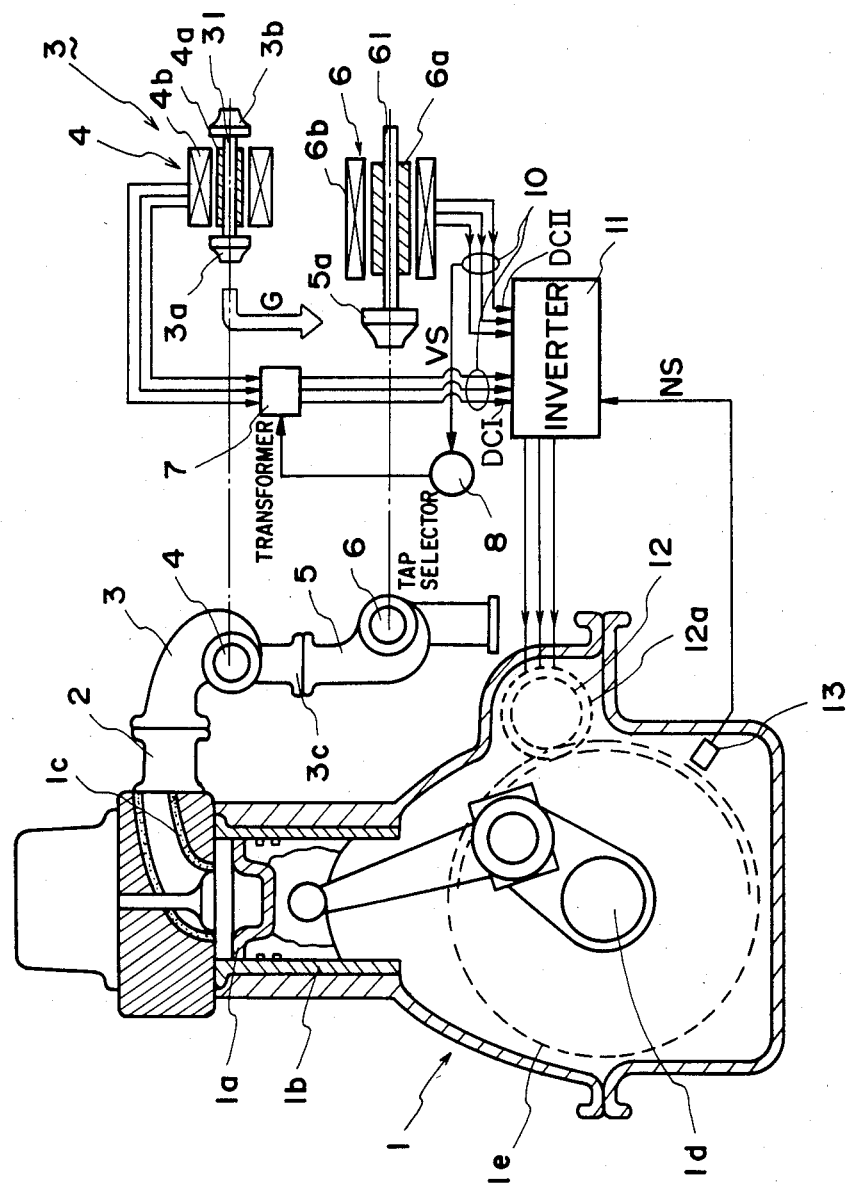
FIG. 1 is a schematic view, partly in cross section, of a turbo compound engine according to the present invention.

As shown in FIG. 1, an internal combustion engine 1 having a thermally insulated construction includes a combustion chamber defined by a piston 1a and a cylinder liner 1b, and an exhaust port 1c, which are all made of ceramics. The exhaust port 1c is connected to an exhaust manifold 2 to which there is coupled a first exhaust turbine comprising a turbocharger 3 having an AC generator/motor 4.

The turbocharger 3 includes a rotatable shaft 31 on which a turbine blade wheel 3a, a rotor 4a of the AC generator/motor 4, and a compressor blade wheel 3b are coaxially mounted and coupled together. The rotor 4a of the AC generator/motor 4 is constructed of a permanent magnet made of a rare earth element and having strong residual magnetism. The AC generator/motor 4 also includes a stator 4b disposed in confronting relation to the rotor 4a and supplied with AC power of a certain frequency from a battery through an inverter (not shown). When the stator 4b is supplied with the AC power, the AC generator/motor 4 operates as a motor to rotate the rotor 4a to cause the shaft 31 to drive the compressor blade wheel 3b for supercharging air into the internal combustion engine 1. The turbine blade wheel 3a is rotated by exhaust gas discharged from the exhaust manifold 2 to drive the rotor 4a. The AC generator/motor 4 now operates as a generator to supply AC power to a transformer 7 coupled to the stator 4b. At the same time, the turbine blade wheel 3a driven by the exhaust gas also rotates the compressor blade wheel 3b which supercharges air into the internal combustion engine 1.

A second exhaust turbine 5 having an AC generator 6 is coupled to an exhaust port 3c of the turbocharger 3 and has a turbine blade wheel 5a which can be driven by an exhaust gas G carrying remaining exhaust energy which is fed from the turbine blade wheel 3a. The turbine blade wheel 5a is coupled to a rotatable shaft 61 on which there is mounted a rotor 6a composed of a permanent magnet having strong residual magnetism. A stator 6b has AC windings disposed in confronting relation to the rotor 6a. The rotor 6a and the stator 6b jointly constitute an AC generator 6. Therefore, when the turbine blade wheel 5a is rotated, electric power is generated by the stator 6b. Although the electric power thus generated by the AC generator 6 is smaller than the electric power which can be generated by the generator/motor 4 in the generator mode, the energy of the exhaust gas G can sufficiently be recovered as electric power.

The transformer 7 has a winding from within a plurality of taps 7a (FIG. 2) are drawn. A tap selector 8 is controlled by a voltage signal VS corresponding to the voltage generated by the AC generator 6 for selecting one of the taps 7a. Therefore, the transformer 7 generates at its output a voltage corresponding to the voltage generated by the AC generator 6.

Figure 2:
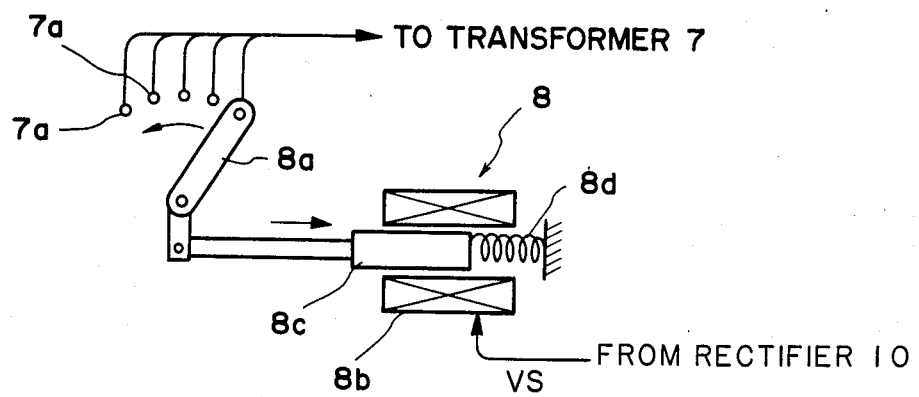
FIG. 2 is a schematic view of a tap selector employed in the present invention.

FIG. 2 shows an arrangement of the tap selector 8. The tap selector 8 comprises a lever 8a for selecting one of the taps 7a at a time, a solenoid coil 8b supplied with the voltage signal VS, a piston or plunger 8c attractable by the coil 8b for moving the lever 8a, and a spring 8d for biasing the piston 8c to its reference position. When the voltage signal VS corresponding to the voltage generated by the AC generator 6 is applied to the coil 8b, the piston 8c is attracted by the coil 8b against the resiliency of the spring 8c to move the lever 8a to select one of the taps 7a which corresponds to the voltage signal VS. Therefore, the taps 7a are selected dependent on the magnitude of the voltage generated by the AC generator 6, so that the electric power generated by the generator/motor 4 and produced from the transformer 7 can be controlled at a voltage dependent on the voltage of the AC generator 6.

The AC output generated by the AC generator 6 and fed through rectifier 10, and the AC output generated by the generator/motor 4, controlled by the transformer 7 and also rectified by the rectifier 10, are applied to an inverter 11 as direct current.

The internal combustion engine 1 has a crankshaft 1d on which there is mounted a gear 1e meshing with a gear 12a that is driven by the shaft of an induction motor 12. A rotation sensor 13 is mounted in the internal combustion engine 1 for detecting the speed of rotation of the crankshaft 1d. A detected signal NS from the rotation sensor 13 is applied to the inverter 11. The inverter 11 adds applied direct currents DCI from the generator/motor 4 and DCII from generator 6, converts the sum to an alternating current having a frequency corresponding to the signal NS from the rotation sensor 13, and supplies the alternating current to the induction motor 12 to energize the same. When the signal NS varies with the speed of rotation of the crankshaft 1d, the frequency of the AC output from the inverter 11 is controlled by the varying signal NS. As a result, the speed of rotation of the induction motor 12 also varies with the speed of rotation of the crankshaft 1d, assisting the torque of the crankshaft 1d at all times.

Operation of the turbo compound engine thus constructed will be described below.

High-temperature exhaust gas discharged by the thermally insulated internal combustion engine 1 is introduced through the exhaust manifold 2 into the turbocharger 3 to drive the generator/motor 4 coupled to the turbine blade wheel 3a in the generator mode. The electric power generated by the generator/motor 4 is applied to the transformer 7.

Exhaust gas G carrying residual exhaust energy is introduced from the turbocharger 3 into the exhaust turbine 5 to rotate blade wheel 5a, thus driving the AC generator 6 coupled thereto. The electric power generated by the AC generator 6 is fed to a rectifier 10. A voltage signal VS corresponding to the voltage of the generated power is transmitted to the solenoid coil 8b of the tap selector 8. Since the tap selector 8 controls the piston 8c with the voltage signal NS to select one of the taps 7a of the transformer 7, the output from the transformer 7 is of a voltage corresponding to the voltage of the AC generator 6.

The electric power outputs from the generator/motor 4 and the AC generator 6 are added by the inverter 11 and converted thereby to AC power which drives the induction motor 12 to rotate the crankshaft 1d. The frequency of the converted AC power is controlled by the signal NS from the rotation sensor 13. If the speed of rotation of the crankshaft 1d is low, then the frequency of the signal NS is also low. Consequently, the AC power output from the inverter 11 is of a low frequency to rotate the induction motor 12 at a low speed, thus assisting the rotation of the crankshaft 1d through the meshing gears 12a, 1e. If the speed of rotation of the crankshaft 1d is high, then the frequency of the signal NS is also high and so is the frequency of the AC power output from the inverter 11. The induction motor 12 is then rotated at a high speed to assist in rotating the crankshaft 1d. Therefore, the torque of the crankshaft 1d is assisted at all times, the assistance being dependent on the speed of rotation of the crankshaft 1d at all times.

In the turbo compound engine according to the present invention, as described above, the exhaust gas discharged from a thermally insulated internal combustion engine is introduced into a turbocharger and an exhaust turbine to drive an AC generator/motor and an AC generator for producing AC electric power through conversion of exhaust energy to electric energy. The generated AC electric power is converted to AC electric power of a certain frequency by an inverter which is frequency-controlled by a signal fed from means for detecting the speed of rotation of the crankshaft of the internal combustion engine. The converted AC electric power is supplied to an induction motor to rotate the same for driving the crankshaft through meshing gears. Therefore, the exhaust energy can be recovered as electric energy for driving the crankshaft, and the rotative power of the crankshaft can be assisted dependent on the speed of rotation of the internal combustion engine.

Although a certain preferred embodiment has been shown and described, it should be understood that many changes and modifications may be made therein without departing from the scope of the appended claims.

What we claim is:

1. A turbo compound engine having a first exhaust turbine coupled to an exhaust pipe of an internal combustion engine and a second exhaust turbine coupled to an exhaust port of the first exhaust turbine; comprising:
   a first generator drivable by said first exhaust turbine;
   a second generator drivable by said second exhaust turbine;
   a motor operatively coupled to an output shaft of said internal combustion engine;
   speed detecting means for detecting the speed of rotation of said internal combustion engine; and
   control means for controlling the frequency of electric power, which is the sum of electric power outputs from said first and second generators and supplied to said motor, based on a signal from said speed detecting means, in order to control operation of said motor.

2. A turbo compound engine according to claim 1, wherein said first exhaust turbine comprises a turbocharger.

3. A turbo compound engine according to claim 1, wherein said motor comprises an induction motor.

4. A turbo compound engine according to claim 1, further including transformer means for controlling the voltage of the electric power output from one of said first and second generators so as to correspond to the voltage of the electric power output from the other generator.

* * * * *